W. M. & J. B. Ellis,
Flue and Tubular Boiler.

No. 1,636. Reissued Mar. 15, 1864.

Witnesses.
H. Clark.
J. Goldin.

Inventor
Wm. M. Ellis
J. B. Ellis

N. PETERS, PHOTO-LITHOGRAPHER, WASHINGTON, D. C.

UNITED STATES PATENT OFFICE.

WILLIAM M. ELLIS AND JONAS B. ELLIS, OF WASHINGTON, DISTRICT OF COLUMBIA.

IMPROVEMENT IN STEAM-BOILERS.

Specification forming part of Letters Patent No. 36,288, dated August 26, 1862; Reissue No. 1,636, dated March 15, 1864.

*To all whom it may concern:*

Be it known that we, WILLIAM M. ELLIS and JONAS B. ELLIS, of the city of Washington, in the District of Columbia, have invented a certain new and useful Improvement in Steam-Boilers; and we do hereby declare that the following is a full, clear, and exact description thereof, reference being had to the accompanying drawings, and to the letters and marks thereon.

In that class of steam-boilers where water-legs are used it is important that there should be a proper communication between the water-legs and the main part or body of the boiler.

Our invention relates to means for keeping open such communication, and in connecting the water-legs to the shell of the boiler at that point or line which will secure a proper circulation of the water.

Figure 1:
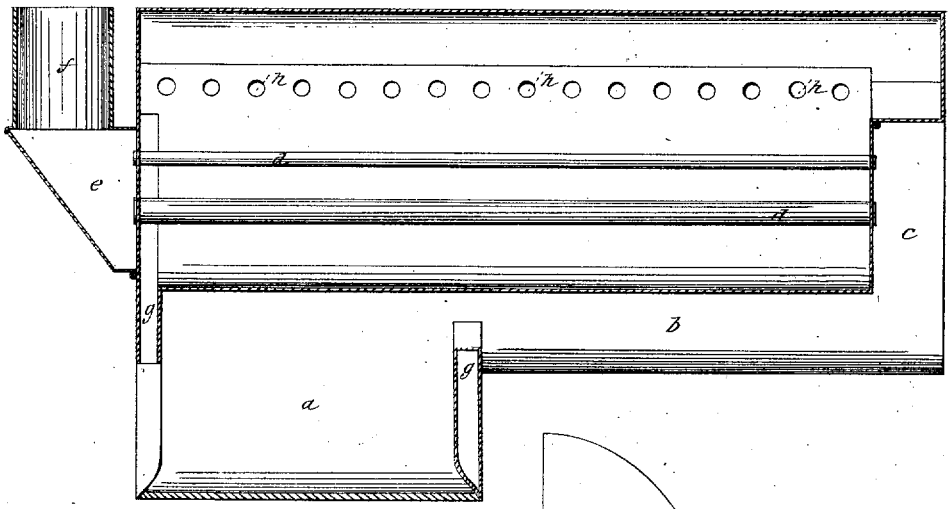
Figure 2:
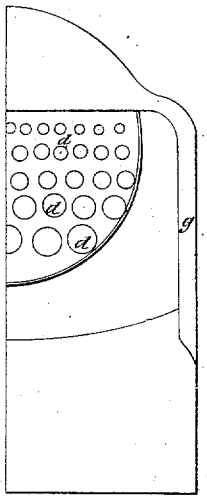

Figure 1 of the drawings, forming part of this specification, is a view by longitudinal section of a horizontal boiler; and Fig. 2, a view of the rear or back end of such section with our invention shown attached thereto.

In each of these figures, where like parts are shown, like marks and letters are used to indicate the parts.

It will be seen that the heat and products of combustion from the fire-box or furnace *a* of the boiler here represented will pass through the flue *b* to the chamber *c*, and thence through the tubes *d* to the uptake *e* and stack *f*. The water-legs *g* of this boiler, as is shown by the drawings, extend continuously from front to rear, and have communication with the body of the boiler by a series of openings, *h*, through the shell of the boiler, or through a plate connecting the flanges of the legs with the shell at the working water-line of the boiler. Now, it will readily be perceived that by having these openings *h* at this line there will be at all times a part of each opening unoccupied by the water, which will not only allow of the passage of steam from the legs to the boiler under ordinary circumstances, but whenever excessive ebullition occurs, as in priming or in forming, these openings will permit the flow of the steam through them from the boiler, and thus act as outlets to relieve the violent agitation of the water in the boiler. By having these openings at the working water-line of the boiler we therefore not only make provision for the circulation of the water from the legs to the boiler, or vice versa, but we also make an excellent provision for the relief of priming, if not for its prevention.

What we claim as our invention, and desire to secure by Letters Patent, is—

Connecting the water-legs extending continuously from the front to the rear of the boiler to the shell of the boiler at the point of the working water-line of the boiler, substantially as herein set forth.

This specification signed this 12th day of February, 1864.

WM. M. ELLIS.
J. B. ELLIS.

Witnesses:
J. D. CLARK,
W. A. BOSS.